(12) United States Patent
Berecz et al.

(10) Patent No.: US 6,302,628 B1
(45) Date of Patent: Oct. 16, 2001

(54) FASTENER RETENTION APPARATUS

(75) Inventors: Imre Berecz, Cato de Caza; Dennis L. Hinton, Yorba Linda, both of CA (US)

(73) Assignee: Fairchild Holding Corp., Dulles, VA (US)

( * ) Notice: Subject to any disclaimer, the term of this patent is extended or adjusted under 35 U.S.C. 154(b) by 0 days.

(21) Appl. No.: 09/574,815

(22) Filed: May 19, 2000

Related U.S. Application Data

(60) Provisional application No. 60/135,132, filed on May 20, 1999.

(51) Int. Cl.[7] .............................. F16B 27/00; F16B 37/00
(52) U.S. Cl. .............................. 411/84; 411/104; 411/112; 411/432
(58) Field of Search .............................. 411/84, 85, 104, 411/111, 112, 113, 432

(56) References Cited

U.S. PATENT DOCUMENTS

| | | | | |
|---|---|---|---|---|
| 2,243,923 | * | 6/1941 | Swanstrom | 411/113 |
| 2,469,311 | * | 5/1949 | Poupitch | 411/84 |
| 2,879,820 | * | 3/1959 | Trzcinski | 411/84 |
| 2,968,329 | * | 1/1961 | Reiner | 411/84 |
| 4,863,327 | * | 9/1989 | Poupiter | 411/112 |

* cited by examiner

Primary Examiner—Neill Wilson
(74) Attorney, Agent, or Firm—Dinnin & Dunn P.C.

(57) ABSTRACT

A fastener retention apparatus 10 for retaining a fastener base 60 has first and second complementary half-channels 20 and 30, each having a plurality of holes 40 therein for acceptance of a fastener 50 to secure the half-channels in a nested arrangement. Each half-channel further has a plurality of slots 24, 34 therein for acceptance of a plurality of tabs 64 depending from the periphery of said fastener base 60, thereby providing for secure retention thereof.

3 Claims, 2 Drawing Sheets

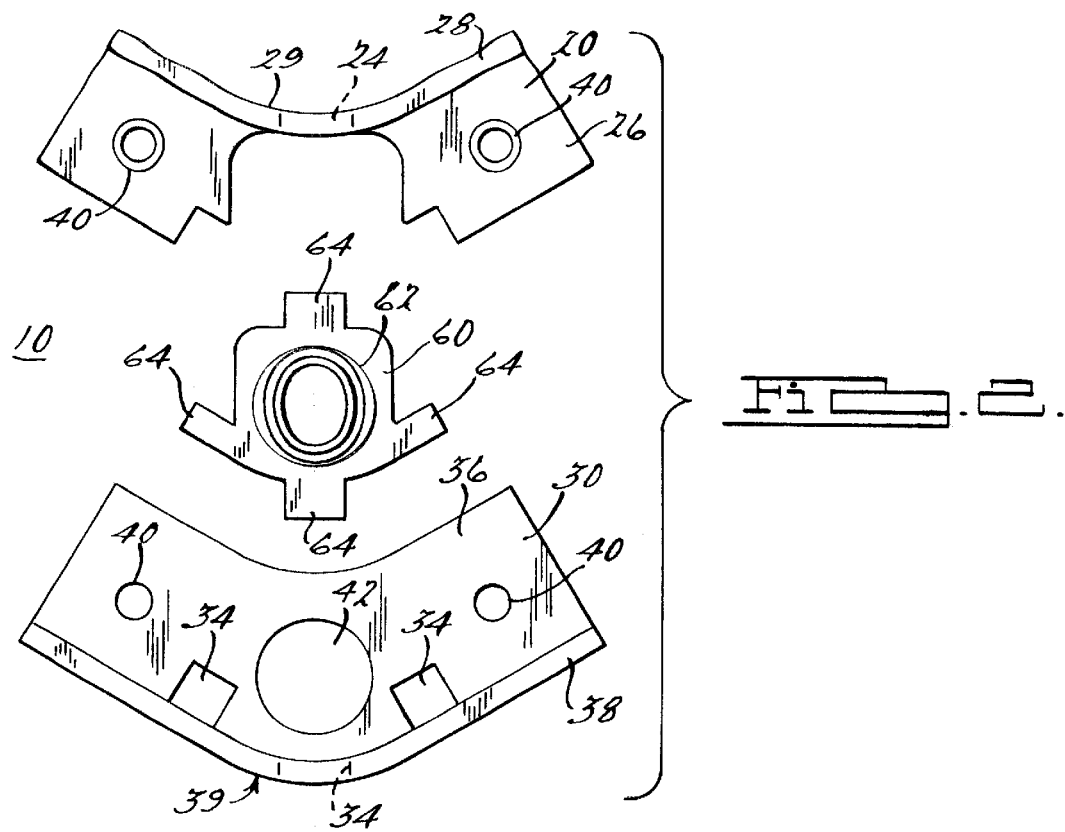
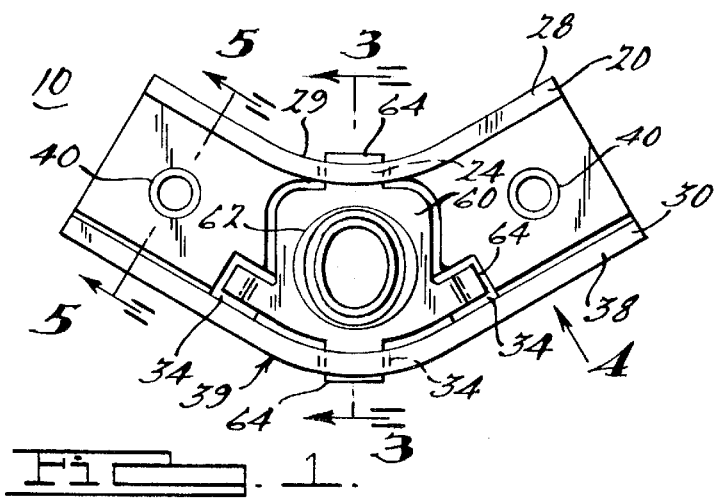
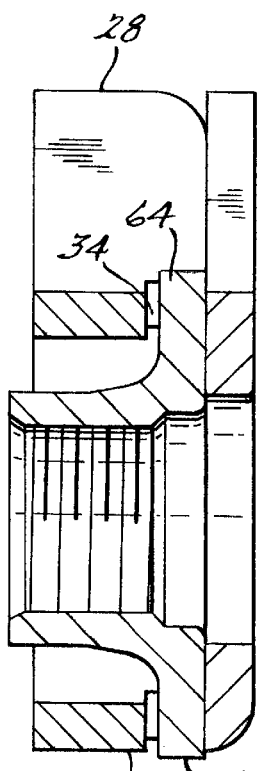
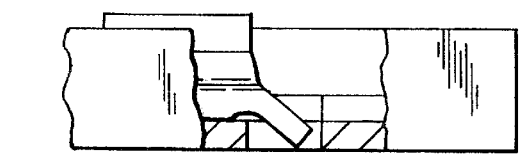
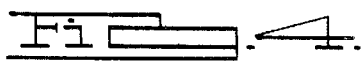
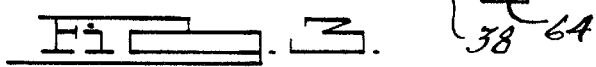

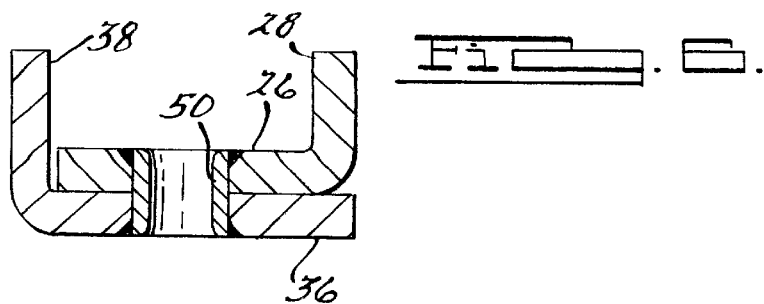
FIG. 6.
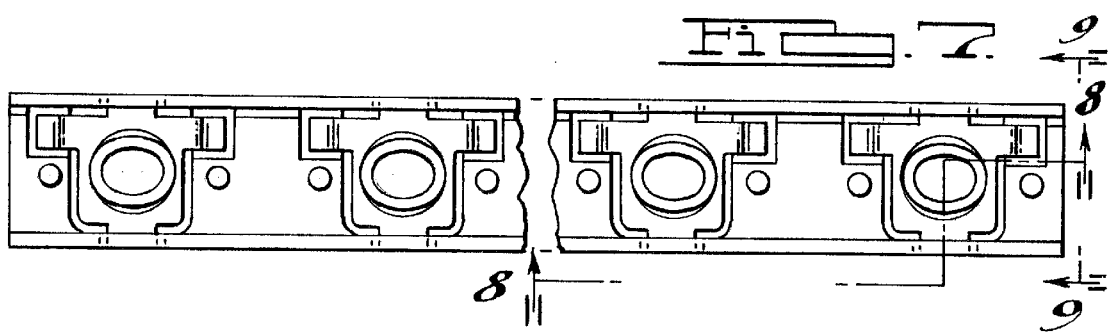
FIG. 7.
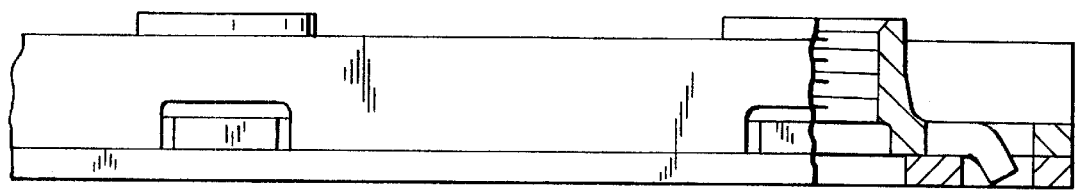
FIG. 8.
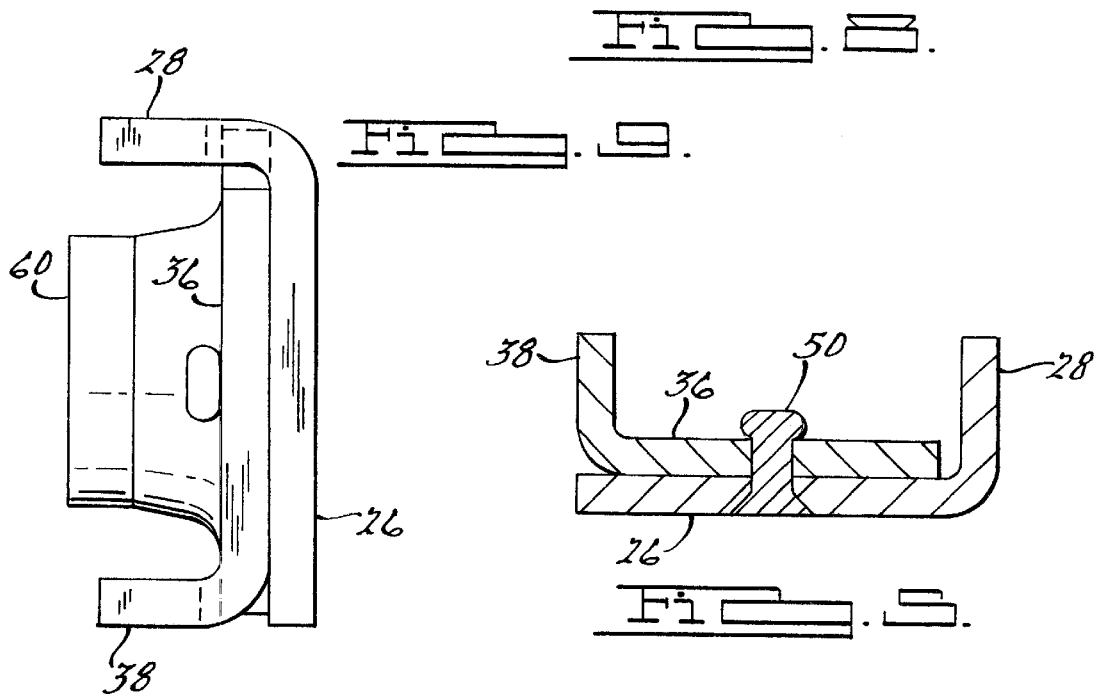
FIG. 9.
FIG. 5.

FASTENER RETENTION APPARATUS

CROSS-REFERENCE TO RELATED APPLICATIONS

The instant application claims the benefit of U.S. Provisional Application Ser. No. 60/135,132 filed May 20, 1999.

BACKGROUND OF THE INVENTION

The instant invention relates generally to a retaining device for fasteners and more specifically to a two piece fastener retention apparatus providing secure, simple retention of a fastener base through juxtaposition of complementary half-channels.

In many fastener applications, particularly aircraft fastener applications, it is desirable to provide for positive retention of all fasteners to reduce the occurrence of foreign object damage caused by engine ingestion of, for example, a loose nut base. Additionally, some applications require the positioning of a nut base in an area where it is not practicable to secure said nut base directly due to interference with other devices or components.

Prior art fastener retention devices configured as single piece channels require the use of spring retainer clips for securing a nut base thereto. Additionally, when manufactured from less rigid material to provide for easier retainer clip installation, prior art devices suffer from a decreased ability to handle high torque loads wherein fastener bases are susceptible to torque-out and push-out as their complementary bolts are tightened.

SUMMARY OF THE INVENTION

The instant invention overcomes the aforementioned problems by providing a two-piece fastener retention channel comprising two complementary interlocking half-channel segments, each having a plurality of slots therein for acceptance of a plurality of tabs depending from a fastener base, for example a conventional nut. The use of tabs depending from the fastener base in conjunction with the complementary channels allows the fastener to be retained simply by aligning the fastener with complementary slots in a first half-channel, and aligning a second, complementary half-channel such that the fastener tabs align with and are inserted into the slots in each half-channel.

The complementary channel halves are further provided with a plurality of concentric holes therein, into which rivets may be positioned to fasten the two channel halves together. By utilizing the unique two-piece channel design, the fastener retention channel may be constructed of a rigid composite material, for example a commercially available thermo-set resin. The use of a one piece rigid material channel design would prohibit the use of tabs depending from the nut base as the tabs would be unable to be snapped into position. This would necessitate the use of a spring retainer clip, thereby adding weight and expense to the assembly. The channel halves may be fabricated in a plurality of shapes as further explained hereinbelow.

Therefore, one object of the instant invention is a fastener retention channel having two complementary half-channels for ease of assembly.

A further object of the instant invention is a two-piece fastener retention channel having a plurality of slots in each complementary half-channel for acceptance of fastener tabs.

A further object of the instant invention is a fastener retention apparatus obviating the necessity of using spring retainer clips.

A further object of the instant invention is a fastener retention apparatus providing superior torque-out and push-out values for fastener bases.

Additional objects, features, and advantages of the present invention will become apparent from the subsequent detailed description, taken in conjunction with the accompanying drawing figures.

BRIEF DESCRIPTION OF THE DRAWINGS

FIG. 1 is a top view of the instant invention.

FIG. 2 is an exploded view of elements of the instant invention as shown in FIG. 1.

FIG. 3 is a view of the instant invention taken along the line 3—3 of FIG. 1.

FIG. 4 is a view of the instant invention taken along the arrow 4 of FIG. 1.

FIG. 5 a view of the instant invention taken along the line 5—5 of FIG. 1.

FIG. 6 is a view of the instant invention similar to FIG. 5, featuring an alternate rivet.

FIG. 7 is a top view of an alternative embodiment of the instant invention.

FIG. 8 is a view of the instant invention taken along the line 8—8 of FIG. 7.

FIG. 9 is a view of the instant invention taken along the line 9—9 of FIG. 7.

DETAILED DESCRIPTION OF THE INVENTION

Referring to drawing FIGS. 1 and 2, and in accordance with a preferred constructed embodiment of the instant invention, a fastener retention apparatus 10 comprises first and second complementary half-channel portions, 20 and 30 respectively, each having a plurality of slots 24 and 34 disposed therein. Each half-channel further has a base portion 26 and 36 respectively, and a wall portion 28 and 38 respectively. In the embodiment of the instant invention shown in FIGS. 1 and 2, each half-channel 20 and 30 further has an arcuate section 29 and 39 therein, respectively. It should be noted that the although several embodiments of the instant invention are shown in the accompanying drawing figures, the complementary channels 20 and 30 may be constructed in various forms with or without the arcuate sections 29 and 39, as would be well known to one of ordinary skill in the art. For example, an alternative embodiment of the instant invention is shown in FIGS. 7 and 8, employing straight half-channels 20 and 30.

Each base 26 and 36 has a plurality of complementary holes 40 therein. The holes 40 are concentric when the complementary half-channels 20 and 30 are nested, and are designed to accept rivets 50 or like fasteners therein for securing the complementary half-channel portions 20 and 30 together, as shown in FIGS. 5 and 6.

As shown in FIGS. 3, 5, and 6, the wall portions 28 and 38 of each complementary half-channel 20 and 30 are on opposed sides thereof so as to form a channel when nested.

Referring again to FIGS. 1 and 2, a fastener base 60 has a circular base portion 62 and a plurality of tabs 64 depending therefrom. The tabs 64 are positioned around the periphery of the fastener base 60 such that they align with the plurality of slots 24 and 34 in the complementary half-channels 20 and 30 when the half-channels are nested. The fastener base 60 typically comprises a conventional nut having an internally threaded portion for engaging a bolt or screw.

In accordance with a preferred constructed embodiment of the instant invention and as best seen in FIG. 2, the first half-channel 20 has a cutout portion 42 therein, shaped to be complementary to the periphery of said fastener base 60. Additionally, and as best seen in FIGS. 4 and 8, the fastener base tabs 64 may be bent into their complementary slots 24 and 34 to retain the fastener base position securely. These two features of the instant invention provide superior torque-out resistance in comparison with known in the art fastener retention devices.

As best seen in FIGS. 5, 6 and 9, the half-channels 20 and 30 are positioned so that the base portion 26 of one half-channel 20 aligns with the wall portion 38 of the other half-channel 30. Thus in operation, the fastener base 60 can be positioned so that the tabs 64 depending therefrom engage the slots 24 of the first half-channel, then the complementary second half-channel 30 is positioned such that the remaining tabs 64 engage the slots 34 therein. The holes 40 in the complementary half-channels 20 and 30 are then aligned to accept rivets 50 to secure the complementary channels together.

The fastener base tabs 64 and the corresponding slots 24 and 34 in the half-channels 20 and 30, may be located in a variety of positions along the periphery of the fastener base 60 and half-channels 20 and 30, depending on push-out and torque-out design requirements, as is well known to one of ordinary skill in the art.

In an alternative embodiment of the instant invention as best seen in FIG. 2, the second half-channel 30 base portion 26 has an additional hole 44 therein, concentric with the circular base portion 62 of said fastener base 60, such that a bolt, screw, or like fastener may be inserted therethrough.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A fastener retention apparatus for a fastener base having a plurality of tabs depending therefrom comprising:

first and second complementary half-channels each having a base and a wall portion, a plurality of apertures in the base portions thereof for acceptance of rivets to secure said half-channels together, and a plurality of spaced slots therein, wherein said plurality of spaced slots are defined within said wall portions for acceptance of the tabs of said fastener base said first half-channel further having a cutout portion in said base complementary to the periphery of said fastener for engagement thereof upon assembly.

2. A fastener retention apparatus as claimed in claim 1 wherein the base portion of said second half-channel has a hole therein concentric with said fastener for acceptance of a bolt therethrough.

3. A fastener retention apparatus as claimed in claim 1 wherein said first and second complementary half-channels are arcuate-shaped.

* * * * *